United States Patent
Fenton et al.

(10) Patent No.: US 8,621,594 B2
(45) Date of Patent: *Dec. 31, 2013

(54) METHOD AND SYSTEM FOR SECURE COMMUNICATION

(75) Inventors: Charles S. Fenton, Ypsilanti, MI (US); Keith E. Shafer, Columbus, OH (US)

(73) Assignee: IBM International Group, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/100,788

(22) Filed: May 4, 2011

(65) Prior Publication Data
US 2011/0209199 A1 Aug. 25, 2011

Related U.S. Application Data

(63) Continuation of application No. 10/040,573, filed on Nov. 2, 2001, now Pat. No. 7,958,550.

(51) Int. Cl.
*G06F 17/00* (2006.01)

(52) U.S. Cl.
USPC .............. 726/12; 726/11; 726/13; 726/14

(58) Field of Classification Search
None
See application file for complete search history.

(56) References Cited

U.S. PATENT DOCUMENTS

| | | | |
|---|---|---|---|
| 6,052,788 A | 4/2000 | Wesinger, Jr. et al. | |
| 6,058,379 A | 5/2000 | Odom et al. | |
| 6,073,242 A | 6/2000 | Hardy et al. | |
| 6,148,290 A * | 11/2000 | Dan et al. | 705/304 |
| 6,266,704 B1 | 7/2001 | Reed et al. | |
| 6,308,276 B1 | 10/2001 | Ashdown et al. | |
| 6,684,329 B1 | 1/2004 | Epstein et al. | |
| 7,130,898 B2 * | 10/2006 | Carter | 709/223 |
| 7,254,645 B2 * | 8/2007 | Nishi | 709/249 |
| 2002/0035533 A1 * | 3/2002 | Mache et al. | 705/37 |
| 2002/0091624 A1 * | 7/2002 | Glodjo et al. | 705/37 |
| 2002/0143855 A1 * | 10/2002 | Traversat et al. | 709/202 |
| 2002/0144135 A1 * | 10/2002 | Langford et al. | 713/200 |
| 2002/0178103 A1 | 11/2002 | Dan et al. | |
| 2002/0188513 A1 * | 12/2002 | Gil et al. | 705/22 |

(Continued)

FOREIGN PATENT DOCUMENTS

EP 0442838 A2 8/1991
WO 98/21683 5/1998

OTHER PUBLICATIONS

Marshall et al., "ALPINE—Application Level Programmable Inter-Network Environment", http://www.cs.kent.ac.uk/people/staff/iwm2/personal/bttjalpine.pdf, 1997.

(Continued)

*Primary Examiner* — Peter Poltorak
(74) *Attorney, Agent, or Firm* — Jackson Walker L.L.P.; Joseph P. Lally

(57) ABSTRACT

A method and system for secure communication is presented. A virtual private proxy is generated based on an agreement between a first entity and a second entity. A first virtual private proxy is associated with the first entity and a second virtual private proxy is associated with the second entity. Data associated with the first entity is monitored at the virtual private proxy. Whether the data violates the agreement is determined and communication of the data from the first virtual private proxy to the second virtual private proxy is disallowed when the data violates the agreement.

20 Claims, 3 Drawing Sheets

(56) References Cited

U.S. PATENT DOCUMENTS

| | | |
|---|---|---|
| 2003/0014270 A1* | 1/2003 | Qureshi et al. .................... 705/1 |
| 2003/0055875 A1* | 3/2003 | Carter .......................... 709/203 |
| 2003/0079029 A1* | 4/2003 | Garimella et al. ............ 709/229 |

OTHER PUBLICATIONS

Sun Microsystem, "Introduction to Portal Server Secure Remote Access", http://docs.sun.com/source/817-7693/1-overview.html, Sep. 2002.

Marshall, I.W. and Roadknight, C., "Adaptive Management of an Active Service Network", BT Technol. J, vol. 18, No. 4, pp. 78-84, Oct. 2000.

Brooks, Charles, et al., "Application-Specific Proxy Servers as HTTP Stream Transducers", Internet Citation http://www.w3.org/Conferences/WWW4/Papers/56/, 9 pages, Dec. 1, 1995.

PCT International Search Report for PCT US02/34834, 7 pages.

Collaboration-Protocol Profile and Agreement Specification Version 1.0, ebXML Trading-Partners Team, May 10, 2001, UN/CEFACT and OASIS, 2001, pp. 1-90.

ebXML Business Process Specification Schema Version 1.01, Business Process Project Team, May 11, 2001, UN/CEFACT and OASIS, 2001, pp. 1-136.

Security Research and the Future, Dr. Dobb's Special Report, Dec. 2000, Bruce Schneier, pp. 1-6, http://www.ddj.com/articles/2000/0013/0013f/0013f.htm.

Code and Other Laws of Cyberspace, Lessig, Lawrence, ISBN 0-465-03913-8, Basic Books 1999, pp. i-297.

\* cited by examiner

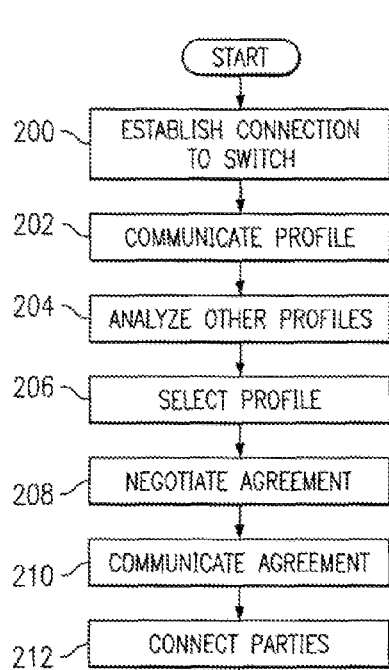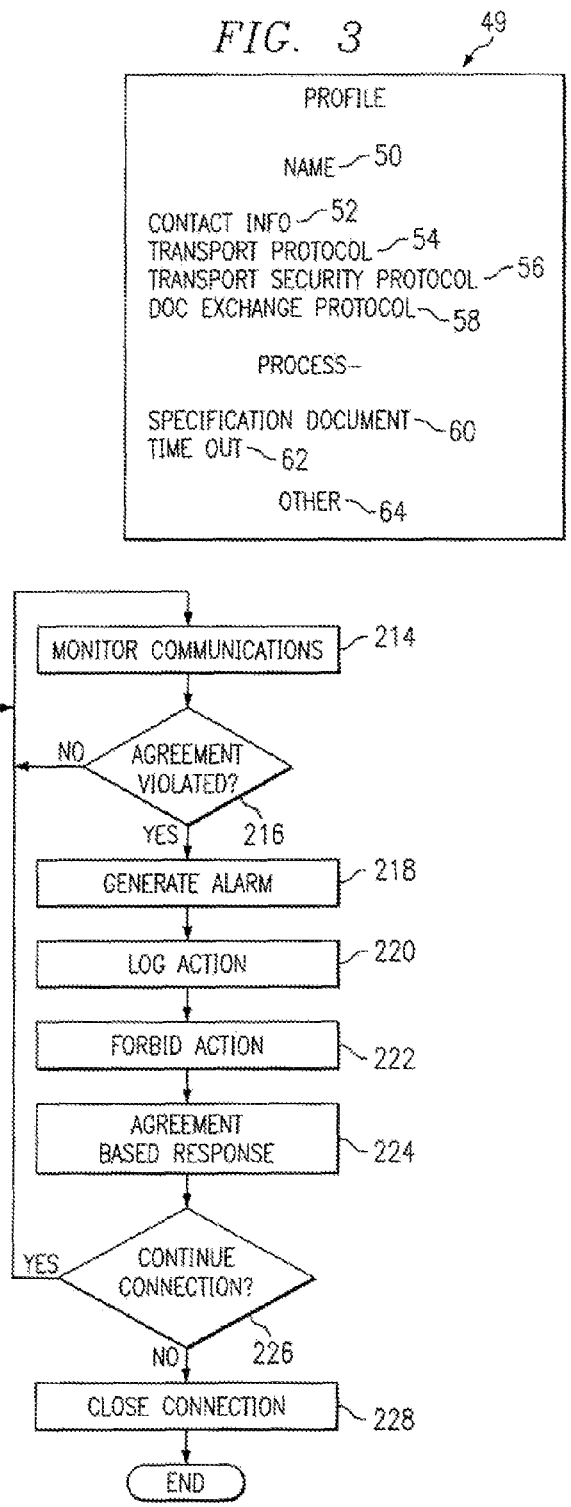

METHOD AND SYSTEM FOR SECURE COMMUNICATION

TECHNICAL FIELD OF THE INVENTION

This invention relates in general to data communication and, more specifically to a method and system for secure communication.

BACKGROUND OF THE INVENTION

As computers have grown increasingly important in today's society, so to has the use of computer networks such as the Internet. As the use of the Internet has increased, more and more businesses have come to rely on the Internet for conducting business. The increasing use of the Internet for business has led to an increase in the number of intrusion attempts on businesses. Often, businesses limit their business use of the Internet due to fears of being attacked and having proprietary information stolen.

Often, when two businesses conduct business over the Internet, a secure connection is used to protect sensitive and proprietary information from interception. One problem with standard secure connections is that the security of the connection is dependent on the security of each of the end-points. For example, a virtual private network (VPN) connection between two businesses protects data communicated between the businesses from interception over the Internet, but does not prevent an intruder from gaining control of one of the businesses and using the VPN to access the other business.

BRIEF DESCRIPTION OF THE DRAWINGS

The present invention is best understood from the detailed description which follows, taken in conjunction with the accompanying drawings, in which:

FIG. 3 is a flow diagram illustrating an exemplary embodiment of a profile used in association with the system of FIG. 1 according to one embodiment of the present invention;

FIG. 5 is a flow chart illustrating a method for secure communication according to one embodiment of the present invention.

DETAILED DESCRIPTION OF THE INVENTION

Figure 1:
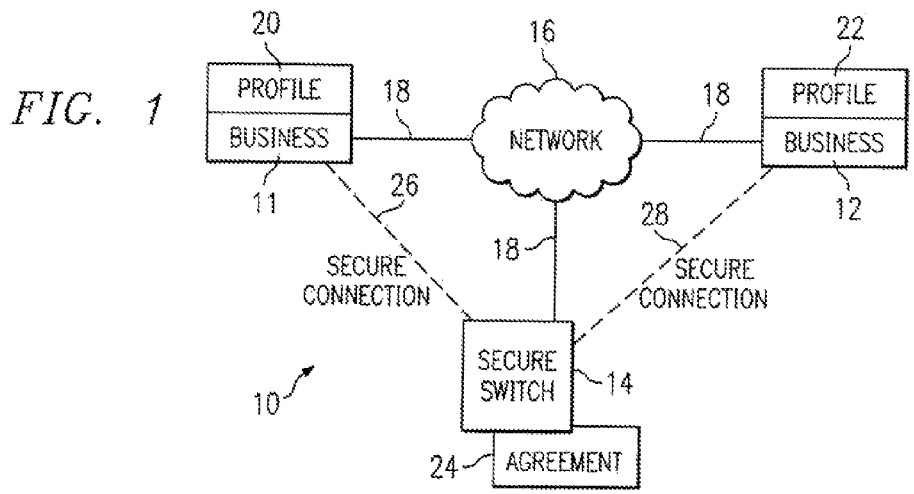
FIG. 1 is a block diagram illustrating a secure interconnection system according to one embodiment of the present invention.

FIG. 1 is a block diagram illustrating a secure interconnection system 10 in accordance with an embodiment of the present invention. System 10 comprises a first business 11, a second business 12, a secure switch 14, and a network 16. Businesses 11 and 12, secure switch 14 and network 16 are coupled by one or more communications links 18. Secure switch 14 has an associated agreement 24. Secure switch 14 communicates with first business 11 over a first secure connection 26 and with second business 12 over a second secure connection 28. First business 11 has an associated first profile 20. Second business 12 has an associated second profile 22.

First business 11 comprises a company, an individual, or another entity, which conducts business with second business 12 over network 16. Fox example, first business 11 may comprise a seller or producer of goods or services.

First profile 20 comprises information associated with first business 11 indicating the types of transactions in which first business 11 will engage. In one embodiment, first profile 20 may specify limits on other businesses that first business 11 will deal with. In addition, profile 20 may indicate how those interactions are to take place. For example, profile 20 may indicate that first business 11 wishes to sell goods or services at a certain price and that orders should be placed using electronic data interchange (EDI) techniques. Profile 20 may comprise an extensible markup language (XML) document.

Second business 12 comprises a company, an individual, or other entity, which desires to do business with first business 11 over network 16. For example, second business 12 may comprise a purchaser of goods or services.

Second profile 22 comprises information associated with second business 12 indicating types of transactions in which business 12 will engage. Also, second profile 22 may indicate how second business 12 wishes to perform those transactions. For example, second profile 22 may indicate that second business 12 desires to buy goods or services and prefers to use XML based communications.

Secure switch 14 comprises a logical location operable to communicate with first and second business 11 and 12 over network 16 and to communicate information between first and second businesses 11 and 12 over secure connections 26 and 28. Secure switch further comprises an agreement 24.

Agreement 24 comprises information specifying parameters regarding how to communicate between first business 11 and second business 22 based on first profile 20 and second profile 22. In one embodiment, agreement 24 comprises a Collaboration Profile Agreement (CPA) expressed in XML. Agreement 24 is generated at either of first or second business 11 or 12, such by being manually created by a user or automatically being generated by a computer. For example, agreement 24 may be based on terms agreed to by first business 11 and second business 12 using first and second profiles 20 and 22. In one embodiment, agreement 24 comprises an XML document indicating the types of data transferable between first business 11 and second business 12 through secure switch 14. Agreement 24 is described in more detail in association with FIG. 4.

Network 16 comprises a suitable data communications network operable to communicate data between first business 11, second business 12 and secure switch 14 over communication links 18. For example, network 16 may comprise an Ethernet network, an asynchronous transfer mode (ATM) network, an Internet protocol (IP) network, a wireless network, a synchronous optical network (SONET), and other suitable wireless and/or wireline network technologies and protocols either alone or in suitable combination. In one embodiment, network 16 comprises the Internet.

Communications links 18 comprise suitable wireless and/or wireline data communication connections. For example, communication links 18 may comprise an optical connection, such as fiber distributed data interchange (FDDI), an Ethernet connection, an ATM connection, a Bluetooth connection, an 802.11B wireless LAN connection, and other suitable networking technologies operable to communicate data between businesses 11 and 12, secure switch 14, and network 16.

Secure connection 26 comprises a secure communication channel between first business 11 and secure switch 14. For example, secure connection 26 may use encryption techniques, virtual private network (VPN) techniques and physical security techniques. Secure connection 28 comprises a secure connection between second business 12 and secure switch 14. For example, secure connection 28 may use encryption, a VPN, and other suitable security techniques. It should be noted that secure connections 26 and 28 as used herein include connections which may be only relatively secure, such as connections 26 and 28 encompass security and other techniques that may be breakable or broken, as well as fully secure connections.

In operation, first business 11 establishes first profile 20 and first secure connection 26 to secure switch 14. Second business 12 establishes second profile 22 and second secure connection 28 to secure switch 14. Agreement 24 is then generated based on first and second profiles 20 and 22. More specifically, information available in first and second profiles 20 and 22 is used by first and second businesses 11 and 12 to reach an agreement so that first and second businesses 11 and 12 can conduct electronic business. For example, an automated process may examine information in first and second profiles 20 and 22 to automatically generate an agreement 24 based on profiles 20 and 22. Alternatively, information in first and second profiles 20 and 22 may be used as the basis for negotiation of agreement 24 between humans associated with business 11 and 12.

Based on agreement 24, secure switch 14 connects secure connection 26 and secure connection 28 so that first and second businesses 11 and 12 may communicate. Secure switch 14 monitors communications between first and second business 11 and 12 in order to enforce agreement 24. More specifically, secure switch 14 monitors data based on agreement 24, such as all data communicated between first and second businesses 11 and 12. For example, agreement 24 may specify that the payloads of data packets communicated between first and second businesses 11 and 12 be examined for viruses. If communications outside of agreement 24, such as data indicating an intrusion attempt, is received at secure switch 14 from either business 11 or 12, then secure switch 14 will take appropriate action. The action taken by secure switch 14 is based on agreement 24. For example, secure switch 14 may block the restricted communication or entirely shut off communication between first and second businesses 11 and 12.

One technical advantage is the capability to support secure communication between two business through a secure switch. By connecting the businesses through the secure switch, the businesses do not have to be concerned with an intruder at the other business gaining access through the other business. Stated another way, a secure connection between two points is only as secure as the two end points. The use of a secure switch protects businesses from security lapses at the other business by controlling and monitoring communications between the businesses through the secure switch. For example, by hiding the virtual private proxies from the view of general Internet users, security at the secure switch is increased.

Figure 2:
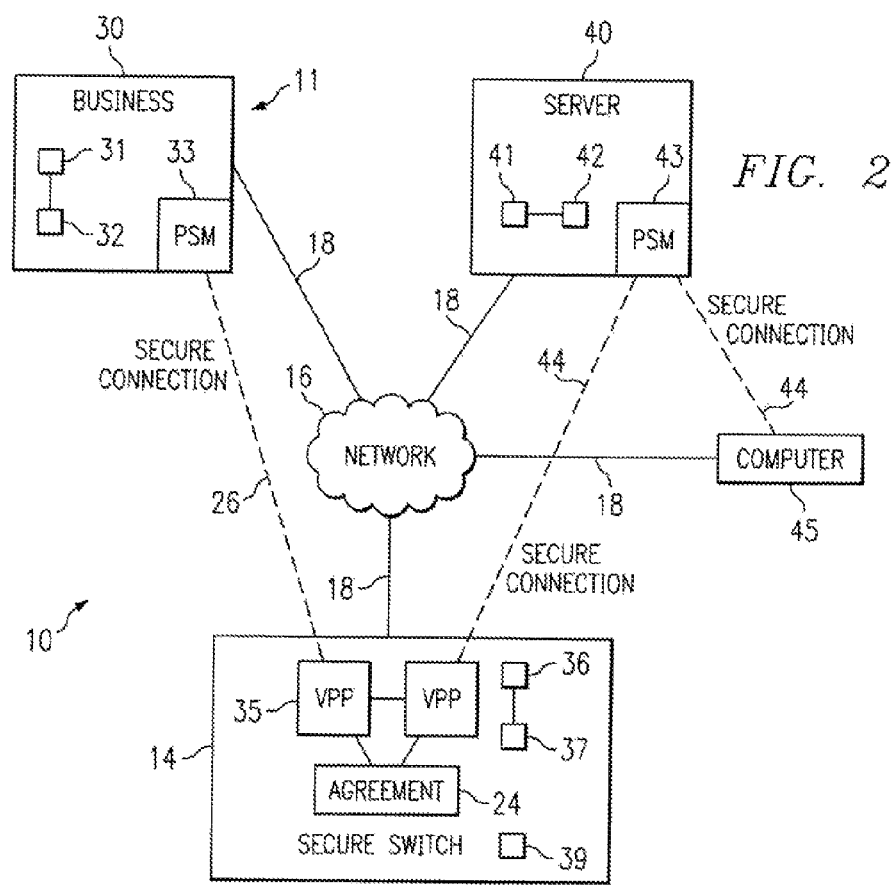
FIG. 2 is a block diagram illustrating additional details of the system of FIG. 1 according to one embodiment of the present invention.

FIG. 2 is a block diagram illustrating additional details of system 10. First business 11 further comprises a server 30 with a processor 31 and memory 32 operable to support execution of a private session manager (PSM) 33. System 10 further comprises a server 40 having a processor 41 and memory 42 and operable to support execution of a distributed private session manager 43 operable to communicate with a computer 45.

Server 30 comprises a suitable general purpose or specialized electronic processing device, such as a PC, a Macintosh, or a UNIX machine. Processor 31 comprises a suitable general purpose or specialized data processing device, such as an application, specific integrated circuit (ASIC), a field programmable gate array (FPGA), a general purpose central processing unit (CPU) or other suitable hardware operable to execute applications and logic stored in storage 32.

Storage 32 comprises suitable transient and/or persistent computer-readable storage, such as a computer-readable medium, either alone or in suitable combination. For example, storage 32 may comprise magnetic storage, optical storage, electronic storage, such as random access memory (RAM) and dynamic random access memory (DRAM) and other suitable physical, optical or electronic storage in suitable combination. Storage 32 is operable to store logic, such as a computer program or application, executable by processor 31.

Private session manager 33 comprises computer logic stored on storage 32 and executable by processor 31. PSM 33 is operable to maintain secure connection 26 with secure switch 14 and manage communication between business 11 and secure switch 14. For example, PSM 33 may comprise a hardware device attached to computer 30. For another example, PSM 33 may comprise a software application executable by processor 31.

Secure switch 14 further includes a virtual private proxy (VPP) 35, a processor 36 and storage 37. Secure switch 14 is further operable to generate an alarm 39.

VPP 35 comprises a logical representation of a logical access point. Typically, VPP 35 represents an access point to a business involved in an agreement 24. Alternatively, VPP 35 may represent an access point for a suitable entity, such as an organization or a person. For example, VPP 35 may represent a logical access point at secure switch 14 to secure connection 26 and first business 11. VPP 35 may alternatively represent a physical access point. For example, VPP 35 may comprise a logical representation of a hard-wired access point, such as a fiber optic connection between two locations. VPP 35 is operable to communicate with PSM 33 and/or PSM 43 over secure connections 26 and 44 under the control of secure switch 14 using agreement 24 as a guide. VPP 35 operates to logically connect businesses through secure switch 14. In one embodiment, VPP 35 is accessible only to businesses associated with agreement 24. Multiple VPPs 35 may be associated with a given secure connection 26. For example, PSM 33 may communicate with multiple VPPs 35. Secure switch 14 may concurrently support multiple VPPs 35.

VPP 35 is further operable to deny access to VPP 35 and secure connection 26 to unauthorized users. For example, secure switch 14 may refuse data received at VPP 35 which did not come over secure connection 26. For another example, when VPP 35 represents a logical entity, secure switch 14 may only reveal the existence of VPP 35 to PSM 33 when PSM 33 contacts secure switch 14 over secure connection 26. Secure switch 14 may alternatively use other suitable authorization and security techniques.

Processor 36 comprises a suitable general purpose or specialized data processing device, such as an application specific integrated circuit (ASIC), a field programmable gate array (FPGA), a general purpose central processing unit (CPU), or other suitable hardware operable to execute applications and logic stored in storage 37.

Storage 37 comprises suitable transient and/or persistent computer-readable storage, such as a computer-readable medium, either alone or in suitable combination. For example, storage 37 may comprise magnetic storage, optical storage, electronic storage, such as random access memory (RAM) and dynamic random access memory (DRAM) and other suitable physical, optical or electronic storage in suitable combination. Storage 37 is operable to store logic, such as a computer program or application, executable by processor 36.

Alarm 39 comprises an indication to either or both of first and second businesses 11 and 12 that agreement 24 has been violated. More specifically, an alarm 39 comprises data associated with the violation of agreement 24. For example, alarm 39 may include the offending data, the portion of agreement 24 which is violated, the source of the improper data and the time of the violation.

Server 40 comprises a processor 41, storage 42 and a distributed private session manager (DPSM) 43. Processor 41 comprises a suitable general purpose or specialized data processing device, such as an application specific integrated circuit (ASIC), a field programmable gate array (FPGA), a general purpose central processing unit (CPU), or other suitable hardware operable to execute applications and logic stored in storage 42. For example, server 40 may be used in association with a laptop computer when first business 12 is connecting to secure switch 14 using the laptop computer.

Storage 42 comprises suitable transient and/or persistent computer-readable storage, such as a computer-readable medium, either alone or in suitable combination. For example, storage 42 may comprise magnetic storage, optical storage, electronic storage, such as random access memory (RAM) and dynamic random access memory (DRAM) and other suitable physical, optical or electronic storage in suitable combination. Storage 42 is operable to store logic, such as a computer program or application, executable by processor 41.

DPSM 43 comprises a PSM similar to PSM 33 and includes additional functionality operable to communicate with remote computer 45 and secure switch 14 over secure connections 44. More specifically, DPSM 43 allows a remote computer 45 lacking a PSM 33 to communicate with secure switch 14.

Secure connection 44 comprises a secure connection between two points. Secure connection 44 may use VPN technologies, encryption technologies, and other suitable security techniques to decrease the chance of data being intercepted while travelling over secure connection 44. Secure connection 44 may represent a logical connection between two points over communication links 18 and network 16.

Computer 45 comprises a suitable general purpose or specialized electronic computer. For example, computer 45 may comprise a portable computer such as a laptop. Computer 45 is operable to support secure connection 44 between computer 45 and server 40.

In operation, PSM 33 initiates a connection with secure switch 14 over secure connection 26. Secure switch 14 then generates VPP 35 for secure connection 26. In one embodiment, secure switch 14 may generate a plurality of VPPs 35 for secure connection 26 so as to manage communications for multiple agreements 24 associated with first business 11. Secure switch 14 generates one or more VPPs for each distinct business and then communicates data from first business 11 to second business 12 through respective VPPs 35.

VPPs 35 and secure switch 14 allow businesses 11 and 12 to communicate in a secure manner and decrease the probability that one end of a secure connection will be compromised. More specifically, secure switch 14 monitors communication between VPPs 35 and determines if the data being communicated will violate agreement 24. If the data being communicated will violate agreement 24, secure switch may prevent the inappropriate data from being communicated to the other VPP 35. For example, inappropriate data, such as an intrusion attempt at a first business, is detected at a first VPP by secure switch 14. In response, secure switch 14 discards the inappropriate data so that the inappropriate data is not communicated to the second VPP 35 to protect a second business from being compromised by the security breach at the first service. For added security, secure switch 14 may completely deactivate the communications link between the VPPs to increase security to the second business.

In addition, secure switch 14 is operable to prevent unauthorized access to VPPs 35. More specifically, secure switch 14 may hide the existence of a VPP 35 from entities which are not parties to agreement 24. By preventing unauthorized entities from knowing of VPP 35, security is increased.

Computer 45 initiates secure connection 44 to PSM 43 at server 40. In one embodiment, the initiation of connection 44 to PSM 43 by computer 45 locks computer 45 in communicating only over secure connection 44 to PSM 43 and excludes all other remote connections. The exclusion of other connections may be done to increase the security of the computer 45 by decreasing the likelihood of a remote connection being made to computer 45 in an attempt to use secure connection 44 in an improper manner. PSM 43 then generates secure connection 44 to secure switch 14 and secure switch 14 generates a VPP 35 for PSM 43. Computer 45 is then allowed to communicate with secure switch 14 through a remote PSM 43.

Another technical advantage is the capability to enforce an agreement on what data may be communicated between the businesses and discard inappropriate data. The secure switch monitors the communications between the businesses and prevents communication of data which is outside the scope of the agreement.

FIG. 3 is a chart illustrating an exemplary embodiment of a profile. Profile 49 comprises a name or other identifier 50, contact information 52, a transport protocol 54, a transport security protocol 56, a document exchange protocol 58, a process specification document 60, a timeout indication 62 and other information 64.

Name 50 comprises an identifier associated with an entity associated with profile 49. The entity may comprise a person, a business, or other suitable logical or physical entity suitable for use with profile 49. In one embodiment, name 50 comprises the name of first business 11. For example, name 50 may comprise "Widget Seller". In general, name 50 comprises a suitable numeric, alphanumeric or other identifier.

Contact information 52 comprises information regarding how to contact the entity associated with profile 49. In one embodiment, contact information 52 comprises contact information for first business 11. For example, contact information 52 may comprise a physical address, an electronic mail address, a phone number, a fax number and other suitable contact information. In general, contact information 52 comprises suitable information for contacting the entity associated with profile 49.

Transport protocol 54 comprises an indication of one or more transport protocols for communication with the entity associated with profile 49. In one embodiment, the entity comprises first business 11. For example, transport protocol 54 may indicate the transmission control protocol/internet protocol (TCP/IP).

Transport security protocol 56 comprises an indication of security protocols for securing transport protocol 54 for communication with the entity associated with profile 49. In one embodiment, protocol 56 comprises a protocol for securing communication to first business 11. For example, the secure Internet protocol (IPSec) may be used.

Document exchange protocol 58 comprises an indication of the protocols for document exchange supported by the entity associated with profile 49. In one embodiment, the entity comprises first business 11. For example, protocol 58 may indicate reliable messaging and non-repudiation are supported.

Process specification document 60 comprises an indication of the business processes of the entity associated with profile 49. In one embodiment, document 60 is expressed in XML, and includes the roles, message payloads, message sequence, and operation signals supported by the business processes. For example, the XML document may describe a seller or buyer, receiving or sending orders, order changes, ship notices, and acknowledgements, in a specific sequence, with specific process state signals, to support proper alignment of the participating business system.

Timeout 62 comprises an indication of how long and/or how many times an entity will attempt to communicate with a recipient entity before giving up. In one embodiment, timeout 62 indicates how long first business 11 will wait for a response from second business 12. For example, if the network connection between the recipient business and network 16 has ceased functioning, business 11 may not continue attempting to communicate with the recipient business after trying 5 times or not receiving data for 1 minute.

Other information 64 comprises customizable and additional information that may be included in profiles 20. Other information 64 is usable to customize profile 20 for particular business 11. For example, other information 64 may include industry specific information associated with business 11, such as a minimum order size for agricultural products.

In operation, for example, first profile 20 may be used to assist other businesses in determining whether to do business with first business 11. For example, second business 12 may be looking for goods sellers to purchase goods from. Second business 12 may search various publicly available profiles for sellers of goods. Once the businesses that sell goods are identified, second business 12 then determines whether business 12 is capable of transacting business with the widget sellers. Second business 12 may prefer to conduct transactions using XML instead of EDI and narrow the list of businesses based on which businesses use XML. Next, second business 12 uses first profile 20 to negotiate with first business 11 to create a business relationship. In general, profiles provide information associated with a business which is useful to other businesses who wish to conduct electronic commerce with the business.

Figure 4:
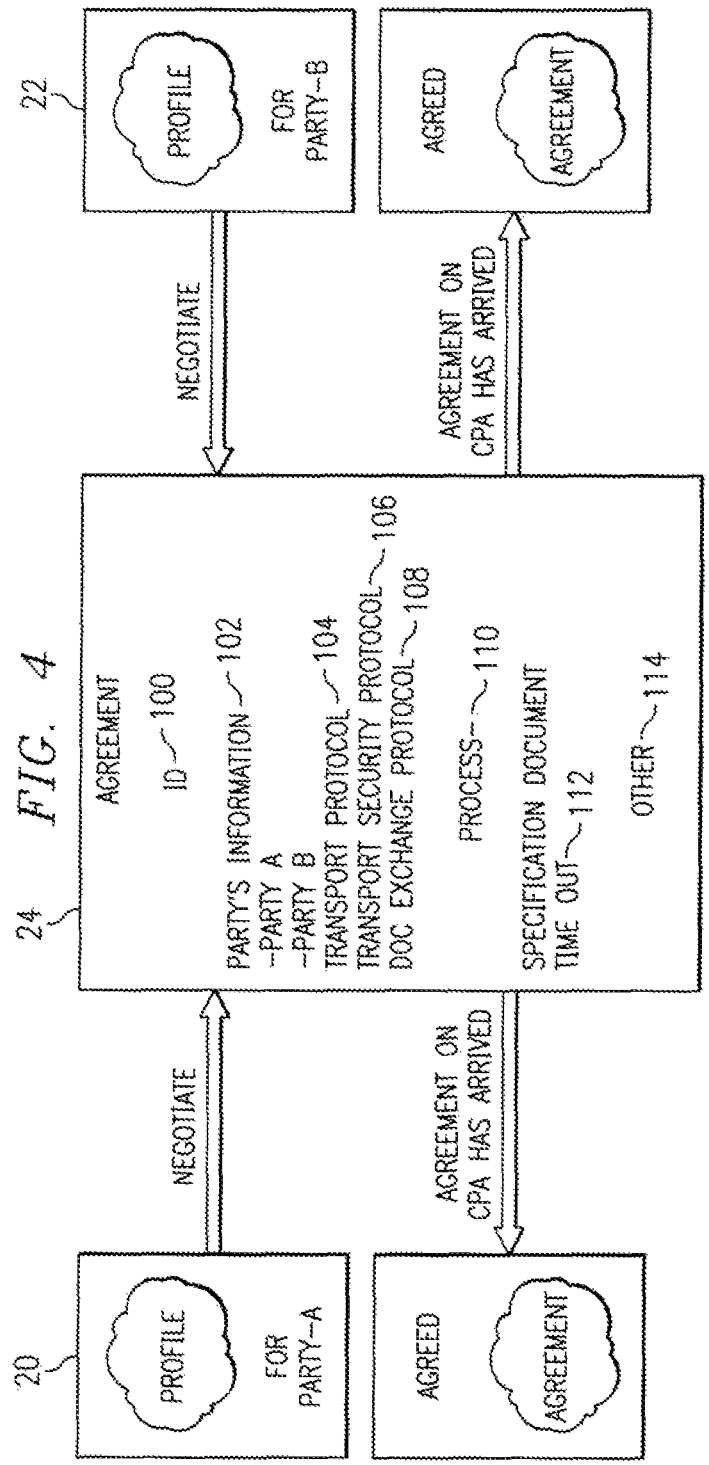
FIG. 4 is a block diagram illustrating details of an agreement used in association with the system of FIG. 1 according to one embodiment of the present invention.

FIG. 4 is a block diagram illustrating details of one embodiment of agreement 24. Agreement 24 comprises an identifier 100, party information 102, a transport protocol 104, a transport security protocol 106, a document exchange protocol 108, a process specification document 110, a timeout value 112 and other information 114.

Agreement 24 is configurable to last for a predetermined period of time. For example, agreement 24 may be configured to be valid for only two hours.

Identifier 100 comprises an identifier associated with agreement 24. In one embodiment, identifier 100 is unique for each agreement 24. Alternatively, identifier 100 may be unique with respect to agreements 24 between first party 20 and second party 22. For example, identifier 100 may comprise a numeric value. Alternatively, identifier 100 may comprise an alphanumeric value or other value.

Party information 102 comprises information associated with the entities involved in a transaction. For example, party information 102 may comprise information associated with first business 20 and second business 22. More specifically, party information 102 may comprise information such as name 50 and contact information 52 from profiles 20 and 22.

Transport protocol 104 comprises an agreed upon protocol for communication between the entities to agreement 24, such as first business 11 and second business 12. For example, transport protocol 104 may comprise TCP/IP.

Transport security protocol 106 comprises an encryption or other security protocol for use with transport protocol 104 to protect communications between the entities associated with agreement 24, such as first business 11 and second business 12. For example, transport security protocol 106 may comprise IPSec.

Document exchange protocol 108 comprises a protocol for exchange of documents between the entities associated with agreement 24, such as first business 11 and second business 12. For example, document exchange protocol 108 may comprise reliable messaging.

Process specification document 110 comprises an indication of the business process agreed to by the entities associated with agreement 24. In one embodiment, document 110 is expressed in XML and includes the roles, message payloads, message sequence, and operation signals of the business process. For example, the XML document may describe a seller or buyer, receiving or sending orders, order changes, ship notices, and acknowledgements, in a specific sequence, with specific process state signals, to support proper alignment of the business systems of each entity associated with agreement 24.

Timeout 112 comprises an indication of the amount of time the entities involved with agreement 24, such as first business 11 and second business 12, will wait for communication. For example, during communication between first business 11 and second business 12, a communications link 18 may fail and timeout 112 would indicate the amount of time either party would wait before assuming that communications have failed.

Other information 114 comprises customization and other specific information for the entities associated with agreement 24, such as first and second businesses 11 and 12. For example, other information 114 may comprise agreed upon information specific to the industry associated with first and second businesses 11 and 12, such as a minimum order size for agricultural products. More specifically, other information 114 may comprise a life span, an invocation limit, a concurrency limit and Uniform Resource Identifiers (URIs).

In operation, first business 11 and second business 12 use profiles 20 and 22 to negotiate agreement 24. Agreement 24 is generated based on the negotiations between first and second businesses 11 and 12 using profiles 20 and 22. More specifically, agreement 24 may be formed from common terms from first and second profiles 20 and 22. Agreement 24 may alternatively be formed using other techniques such as human-based negotiation between business 11 and 12. Agreement 24 is then communicated to first and second businesses 11 and 12. Agreement 24 is used by secure switch 14 to control communications between first business 11 and second business 12.

FIG. 5 is a flow chart illustrating a method of operation according to one embodiment of the present invention. The method begins at step 200, where first and second businesses 11 and 12 establish a connection to secure switch 14. For example, first and second businesses 11 and 12 may connect to secure switch 14 using secure connections 26 over network 16 and communication links 18. Next, at step 202, first business 11 and second business 12 make their respective profiles 20 and 22 available. For example, first business 11 may communicate profile 20 to a central Internet repository, such as secure switch 14, for use by other businesses. Alternatively, first business 11 may make first profile 20 available from a web page associated with first business 11 or from some other predetermined location. For increased clarity, only first business 11 and first profile 20 will be discussed for the remainder of FIG. 5, however a similar discussion is appropriate for second business 12 and second profile 22.

Proceeding to step 204, first business 11 analyzes other profiles, such as second profile 22. First business 11 may retrieve the other profiles from suitable locations, such as secure switch 14, second business 12, or other suitable sources such as a central repository for profiles. Next, at step 206, first business 11 selects one of the profiles to determine a second business with which to transact business. Then, at step 208, first business 11 and second business 12 negotiate agreement 24 based on profiles 20 and 22. In one embodiment, agreement 24 may be negotiated automatically based on first and second profiles 20 and 22. For example, agreement 24 may be generated such that it includes similar elements from first and second profiles 20 and 22 with additional information being filled in based on default values associated with one or both of the businesses. Alternatively, agreement 24 may be generated based on profiles 20 and 22 and a human determination of one or more elements of agreement 24. In general, agreement 24 may be negotiated and generated using suitable techniques based on information available from either or both of first and second profiles 20 and 22 and other external input. Then, at step 210, agreement 24 is communicated to secure switch 14 for managing communication between first and second businesses 11 and 12. Agreement 24 may also be communicated to either or both of first and second businesses 11 and 12.

Proceeding to step 212, secure switch 14 connects first and second businesses 11 and 12 over secure connections 26 and 28 according to agreement 24 using VPPs 35. More specifically, secure switch 14 generates a logical connection between secure connections 26 and 28 so as to allow data to flow between first and second businesses 11 and 12. For example, a VPP may be generated within secure switch 14 for each of secure connections 26 and 28 and then connected within switch 14 to enable data communication.

Next, at step 214, secure switch 14 monitors data being passed between first and second businesses 11 and 12 for compliance with agreement 24. More specifically, secure switch 14 evaluates data communicated over the link between VPPs 35 to determine whether the data is allowed by agreement 24. For example, agreement 24 may specify that only XML data be communicated between businesses 11 and 12, secure switch 24 may detect the transmission of executable data and disallow the transmission. For another example, secure switch 14 may detect the data signature associated with a virus or a malicious program and disallow the communication of the virus or malicious program. For yet another example, secure switch 14 may detect data associated with intrusion attempts, such as a port scan, and disallow the data associated with the intrusion attempt. In general, secure switch 14 may enforce both positive and negative limitations on data communicated between VPPs 35. Positive limitations comprise indications of the type of data allowed, such as limitations that only XML or EDI data be communicated under agreement 24. Negative limitations comprise indications of types of data which are disallowed, such as executable code and intrusion attempts.

Then, at decisional step 216, secure switch 14 determines whether agreement 24 has been violated. For example, inappropriate data may be received from first business 11, such as executable code, which is not allowed by agreement 24. If agreement 24 is not violated, then the NO branch of decisional step 216 returns to step 214 where secure switch 14 continues to monitor communications between first and second businesses 11 and 12.

If agreement 24 is violated, then the YES branch of decisional step of 216 leads to step 218. At step 218, secure switch 14 generates alarm 39. Alarm 39 is communicable to an appropriate entity, such as an administrator, as indicated in agreement 24. For example, other data 114 may include a contact at a given business to whom alarms are reported, such as by electronically mailing a copy of alarm 39 to a system administrator. Next, at step 220, the disallowed action is logged. More specifically, the disallowed action may be logged by secure switch 14 and/or by PSM 33. For example, a log file may be maintained at secure switch 14 for agreement 24. Proceeding to step 222, secure switch 14 forbids the action which violates agreement 24. Then, at step 224, the secure switch 14 responds to the illegal action based on agreement 24. For example, secure switch 14 may block communication of the inappropriate data to the other business.

Proceeding to decisional step 226, secure switch 14 determines whether the connection between first business 11 and second business 12 is to be continued in view of the violation of agreement 24. If agreement 24 specifies that communication between first and second businesses 11 and 12 cease upon violation of agreement 24 then the NO branch of decisional step 226 leads to step 228 where the connection between first and second business 11 and 12 and secure switch 14 is closed. If communication is to continue between first and second business 11 and 12, then the YES branch of decisional step 226 returns to step 214. In general, agreement 24 may specify that communication cease on any violation, or one or more specific violations so as to support suitable customization of agreements 24.

The present invention provides various technical advantages, some of which are discussed above. Various embodiments of the present invention may provide all, some or none of these technical advantages. Other changes, substitutions, and alterations are also possible without departing from the spirit and scope of the present invention, as defined by the following claims.

What is claimed is:

1. A secure network communication method, the method comprising:
    accessing, by a secure switch, a secure network communication agreement between a first entity and a second entity;
    generating, by the secure switch, a first virtual private proxy and a second virtual private proxy;
    establishing a first secure connection between the first virtual private proxy and the first entity;
    prohibiting remote connections to the first entity other than the first secure connection;
    establishing a second secure connection between the second virtual private proxy and the second entity;
    establishing a logical connection between the first virtual private proxy and the second virtual private proxy; and
    generating an alarm when transaction data transmitted over the logical connection is not in compliance with the agreement.

2. The method of claim 1, wherein establishing the first secure connection occurs in response to receiving a connection request from a private session manager.

3. The method of claim 1, wherein generating the alarm further comprises:
    generating alarm data selected from a portion of the transaction data that is not in compliance with the agreement, a portion of the agreement associated with the alarm, data indicative of a source of the transaction data that is not in compliance with the agreement, and data indicative of a time associated with the alarm.

4. The method of claim 1, further comprising:
evaluating whether the transaction data is explicitly allowed by the agreement; and
generating the alarm when the transaction data is not explicitly allowed by the agreement.

5. The method of claim 1, further comprising:
evaluating whether the transaction data is explicitly forbidden by the agreement; and
generating the alarm when the transaction data is explicitly forbidden by the agreement.

6. The method of claim 5, wherein transaction data that is explicitly forbidden by the agreement includes data selected from executable data, data indicative of a signature of a malicious program, and data indicative of an intrusion attempt.

7. The method of claim 1, wherein the agreement specifies a parameter selected from a timeout value, a transport protocol, a transport security protocol, and a document exchange protocol.

8. The method of claim 1, further comprising:
receiving first electronic commerce information for the first entity and second electronic commerce information for the second entity; and
modifying the agreement based on the first electronic commerce information and the second electronic commerce information.

9. A secure switch, comprising:
a processor configured to access storage media including program instructions, executable by the processor, the program instructions including instructions to:
access an agreement for secure network communication between a first entity and a second entity, the agreement based on a first profile for the first entity and a second profile for the second entity;
generate a first virtual private proxy and a second virtual private proxy;
establish a first secure connection between the first virtual private proxy and the first entity;
exclude all remote connections to the first entity other than the first secure connection;
establish a second secure connection between the second virtual private proxy and the second entity;
establish a logical connection between the first virtual private proxy and the second virtual private proxy; and
monitor, for compliance with the agreement, transaction data arriving at the first virtual private proxy and the second virtual private proxy for transmission over the logical connection between the first entity and the second entity.

10. The secure switch of claim 9, wherein the program instructions include instructions to:
recognize a violation of the agreement when the transaction data is not in compliance with the agreement;
generate alarm data associated with the violation, wherein the alarm data is selected from a portion of the transaction data that is not in compliance with the agreement, a portion of the agreement associated with the violation, an indication of a source of the transaction data associated with the violation, and a time associated with the violation.

11. The secure switch of claim 9, wherein the program instructions include instructions to:

when the transaction data violates the agreement, block transmission of the transaction data between the first entity and the second entity.

12. The secure switch of claim 9, wherein the program instructions include instructions to:
when the transaction data complies with the agreement, allow transmission of the transaction data between the first entity and the second entity.

13. The secure switch of claim 9, wherein the first profile includes electronic commerce information for the first entity and the second profile includes electronic commerce information for the second entity.

14. The secure switch of claim 13, wherein the program instructions include instructions to:
receive the first profile for the first entity and the second profile for the second entity; and
modify the agreement based on the first profile and the second profile.

15. The secure switch of claim 14, wherein the instructions to modify the agreement include instructions to generate the agreement.

16. Non-transitory storage media including program instructions for implementing secure network communications at a secure switch, the program instructions including instructions executable to:
access an agreement for secure network communication between a first entity and a second entity, the agreement based on a first profile for the first entity and a second profile for the second entity;
generate a first virtual private proxy and a second virtual private proxy;
establish a first secure connection between the first virtual private proxy and the first entity;
exclude all remote connections to the first entity other than the first secure connection;
establish a second secure connection between the second virtual private proxy and the second entity;
establish a logical connection between the first virtual private proxy and the second virtual private proxy;
monitor, for compliance with the agreement, transaction data arriving at the first virtual private proxy and the second virtual private proxy for transmission over the logical connection;
when the transaction data is not in compliance with the agreement, recognize a violation of the agreement and generate alarm data associated with the violation; and
when the transaction data complies with the agreement, allow transmission of the transaction data between the first entity and the second entity.

17. The storage media of claim 16, wherein the program instructions include instructions executable to:
when the transaction data is not in compliance with the agreement, block transmission of the transaction data between the first entity and the second entity.

18. The storage media of claim 16, wherein the alarm data include data selected from a portion of the transaction data that is not in compliance with the agreement, a portion of the agreement associated with the violation, an indication of a source of the transaction data that is not in compliance with the agreement, and a time of the violation.

19. The storage media of claim 16, wherein the program instructions include instructions executable to:
receive the first profile for the first entity and the second profile for the second entity; and
modify the agreement based on the first profile and the second profile.

wherein the agreement specifies information selected from a timeout value, a transport protocol, a transport security protocol, and a document exchange protocol.

20. The storage media of claim 16, wherein the program instructions include instructions executable to:
 receive a connection request from a private session manager; and
 disclose an identifier for the first virtual private proxy only to the private session manager.

* * * * *